Jan. 14, 1930.   D. C. JOHNSON   1,743,220
LUGGAGE CARRIER FOR AUTOMOBILES
Filed April 13, 1927
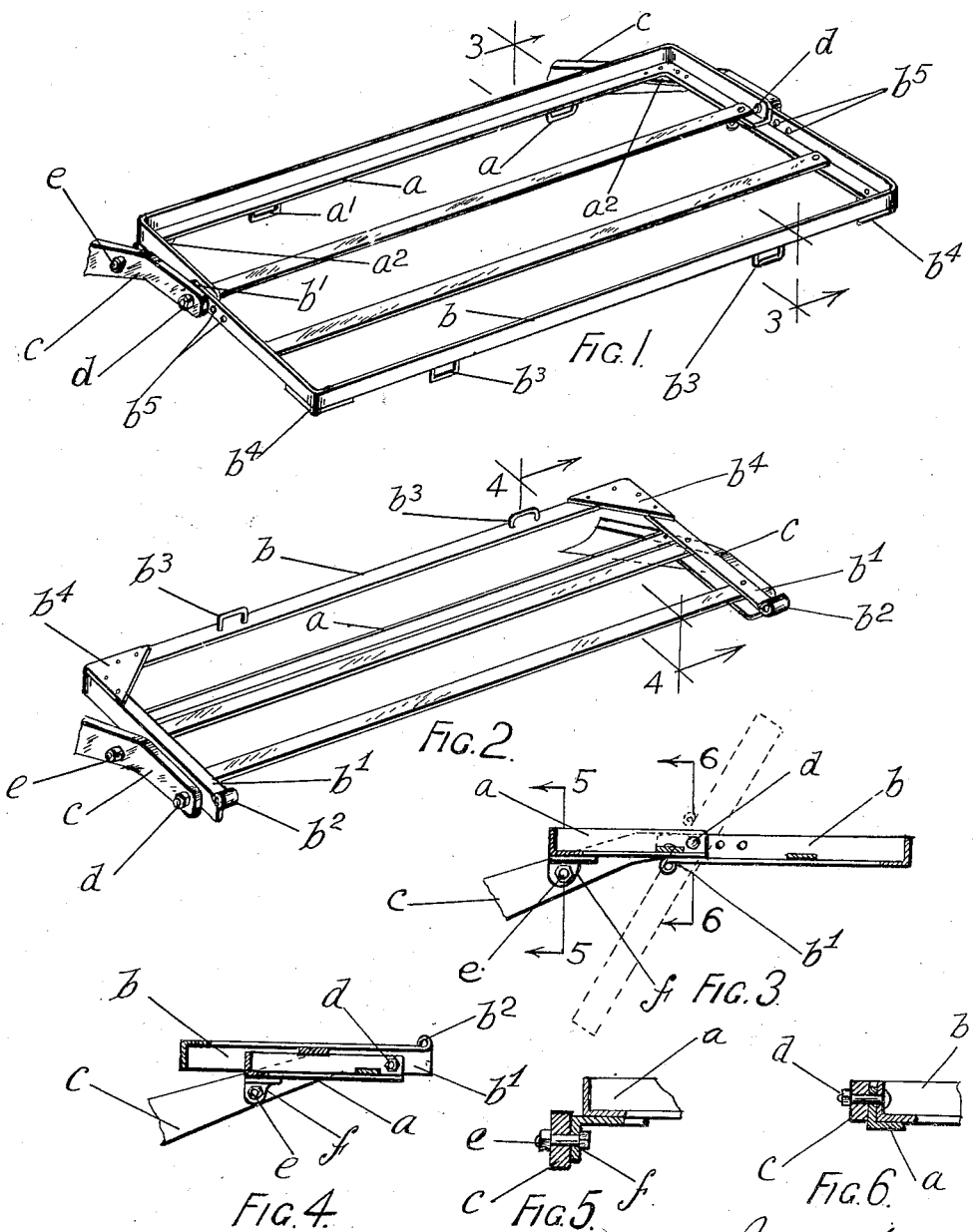

Patented Jan. 14, 1930

1,743,220

UNITED STATES PATENT OFFICE

DAVID CURTIS JOHNSON, OF WARATAH, NEW SOUTH WALES, AUSTRALIA

LUGGAGE CARRIER FOR AUTOMOBILES

Application filed April 13, 1927, Serial No. 183,483, and in Australia September 17, 1926.

This invention relates to the class of rack attached to the rear of an automobile for the purpose of providing a convenient carrier for portmanteaux, boxes, rugs and other luggage, and constitutes improvements on those hitherto in use.

The carriers of this class hitherto in use are of fixed superficial area, incapable of expansion, their members usually fold one above the other, and when loaded access to a spare tyre or wheel usually carried at the rear of an automobile is, impeded.

This device consists of a folding rack designed to be secured transversely at the rear of the car and distinguished from similar devices of the same kind in that it is capable of extension and contraction, also that when folded, one of its members fits within the other, and further that it is tiltably mounted on a pair of bracket arms, attached to the chassis of the car, so as to permit of its being tilted at will to facilitate the removal or replacement of a spare tyre or wheel secured to the back of the car.

The carrier consists of two three-sided rectangular members formed of light angle iron, having the free ends of their frame bars pivoted to one another and, having a series of longitudinally placed light bars or rods secured to the under face of the frame-bars. The two rectangular members are of unequal size, the larger being adapted, when the device is not in use, to fold over the smaller which is then accommodated neatly within the larger.

For the purpose of maintaining the two members in the same horizontal plane, when the device is extended, the free ends of the end frame bars of one member are extended about two inches beyond the pivot point, these extensions forming stops or supports for the purpose above stated.

One of the members has its end frame-bars, in the immediate vicinity of the pivoting point, provided with a series of holes of a size to receive the pivot bolts, so that the carrier or rack, when horizontally extended for use, can be adjusted to provide a greater or smaller surface area to accord with the size of the article or articles it is desired to place thereon or thereunder.

The two members are pivotally connected by bolts which passing through the holes provided therefor in their end frame bars, trunnion within openings provided at, or near, the ends of a pair of supporting bracket arms. The smaller member is further secured to the said bracket-arms by holding bolts passing therethrough and registering with openings provided therefor in a pair of depending lugs secured beneath the frame-bars of the said smaller member.

For the purpose of making my invention readily understood, I shall now refer to the accompanying drawings in which Fig. 1 is perspective view of carrier fully extended.

Fig. 2 is perspective view of carrier in the folded position.

Fig. 3 is cross section on plane 3. 3. of Fig. 1 indicating by dotted lines the positions taken up by the parts when the carrier has been tilted.

Fig. 4 is a cross sectional elevation on plane 4. 4. of Fig. 2.

Fig. 5 is a fragmentary cross sectional elevation on plane 5. 5. of Fig. 3.

Fig. 6 is a fragmentary cross sectional elevation on plane 6. 6. of Fig. 3.

Similar reference characters designate corresponding parts throughout the several figures of the drawings.

Referring to the drawings, the carrier includes a smaller main member designated generally by the reference character "$a$", constructed of light angle iron, in the shape of three sides of a rectangle having its two free ends pivoted respectively to the free ends of brackets "$c, c$" by means of bolts "$d, d$" passing through the upper side of the angle iron and the said bracket, the latter being secured to a suitable part of the rear of the automobile (not shown).

The corners of the member "$a$" are strengthened by the small plates "$a^2, a^2$" (refer to Fig. 1) which are secured to the under surface of the angle iron and which also serve as bearing plates to which are secured the positioning lugs or angle brackets "$f, f$" (refer to Figs.

2 and 3), through the depending portion of each of which and through each bracket "c" passes a bolt "e" which when in functional position prevents movement of the member "a" relative to the brackets "c, c".

One or more longitudinal ribs or cross bars are secured to the smaller main member and serve to strengthen the latter and to support luggage or other articles placed on the carrier, and keepers "$a^1$, $a^1$" (refer to Fig. 1) are affixed to the underside of the longitudinal side of the member "a" for the purpose of retaining securing straps or the like in position.

The larger main member, designated generally by the reference character "b" is also rectangular and constructed of light angle iron, and has a greater superficial area, greater lateral width and slightly greater length than the member "a" so that its free ends overlap and lie without the free ends of the latter member as clearly shown in Fig. 1.

The free ends of member "b" are pivoted to the brackets "c, c" by the bolts "d, d" which pass through holes in the upper portion of the angle iron as in the case of member "a", and additional holes "$b^5$, $b^5$" are provided in this portion of the angle iron to allow of adjustment of the larger towards the smaller member and consequent variation in the superficial area of the carrier.

The said free ends of member "b" are carried past the outmost bolt holes to form extensions "$b^1$, $b^1$" (having roll ends "$b^2$, $b^2$") which underlie the ends of member "a" (as shown in Fig. 3) thus forming stops which prevent the larger member "b" from dropping below the plane of the member "a" when the carrier is in the extended position shown in Fig. 1.

Strengthening plates "$b^4$, $b^4$" are secured to the member "b" at the corners, and one or more longitudinal ribs are secured to the member for the same purpose as those secured to member "a", and strap keepers "$b^3$, $b^3$" are secured to the underside of longitudinal side of the member.

In use the members are unfolded as shown in Fig. 1 the superficial area being adjusted as required by appropriately adjusting the bolts "d, d" in selected holes "$b^5$, $b^5$" in the larger member, and the lugs "f, f" secured to the brackets "c, c" by means of the bolts "e, e"; the luggage is then placed on the carrier and secured thereto by straps passed through the keepers.

When it is desired to remove a spare wheel or tyre secured to the rear of the automobile, the bolts "e, e" are removed, thus allowing the carrier to tilt on the pivotal bolts "d, d", as shown by the dotted lines in Fig. 3, and so provide sufficient space to permit the spare tyre or wheel to be readily removed or replaced. The carrier is then tilted back and the securing bolts replaced. These holding bolts may, if required, be provided with wing nuts for ease of removal.

When out of use the larger member "b" is folded upwardly about the pivot bolts to finally lie flat on the top of the smaller member "a" as shown in Fig. 2.

What I claim and desire to secure by Letters Patent is:—

A luggage carrier of the class described, comprising a larger and a smaller frame member each fitted with a cross bar and each constituting three sides of a rectangle, the meeting ends of said frames being pivoted together and coincidently to bracket arms for attachment to a chassis, the larger member being adapted to fold over the smaller when out of use and to lie in substantially the same plane thereas when in functional position, the sides of the larger member projecting under those of the smaller beyond the pivotal points when in functional position to form positioning stops for the larger member, the smaller frame member having attached to its corners, brackets, detachably secured to said bracket arms, and said larger frame member having at each of its ends a series of pivot-receiving holes to permit adjustment of the superficial area of the carrier.

Signed at Newcastle, New South Wales, Australia, this seventeenth day of March, A. D. 1927.

DAVID CURTIS JOHNSON.